US012790471B2

(12) United States Patent
Kumar et al.

(10) Patent No.: US 12,790,471 B2
(45) Date of Patent: Nov. 10, 2026

(54) POLYETHYLENE COMPOSITION FOR FILM APPLICATIONS WITH IMPROVED TOUGHNESS AND STIFFNESS

(71) Applicants: ABU DHABI POLYMERS CO. LTD (BOROUGE) SOLE PROPRIETORSHIP L.L.C., Abu Dhabi (AE); BOREALIS AG, Vienna (AT)

(72) Inventors: Ashish Kumar, Abu Dhabi (AE); Senthil Kumar Kaliappan, Abu Dhabi (AE); Sadiqali Cheruthazhekatt, Abu Dhabi (AE); Rakesh Pandya, Mumbai (IN)

(73) Assignees: BOREALIS AG, Vienna (AT); ABU DHABI POLYMERS CO. LTD (BOROUGE) SOLE PROPRIETORSHIP L.L.C., Abu Dhabi (AE)

( * ) Notice: Subject to any disclaimer, the term of this patent is extended or adjusted under 35 U.S.C. 154(b) by 679 days.

(21) Appl. No.: 18/259,091

(22) PCT Filed: Dec. 22, 2021

(86) PCT No.: PCT/EP2021/087322
§ 371 (c)(1),
(2) Date: Jun. 23, 2023

(87) PCT Pub. No.: WO2022/144275
PCT Pub. Date: Jul. 7, 2022

(65) Prior Publication Data
US 2024/0076480 A1 Mar. 7, 2024

(30) Foreign Application Priority Data
Dec. 28, 2020 (EP) .................................... 20217429

(51) Int. Cl.
*C08L 23/0807* (2025.01)
*C08F 210/16* (2006.01)
*C08J 5/18* (2006.01)

(52) U.S. Cl.
CPC ........ *C08L 23/0815* (2013.01); *C08F 210/16* (2013.01); *C08J 5/18* (2013.01); (Continued)

(58) Field of Classification Search
CPC ............. C08L 23/0815; C08L 2203/16; C08L 2205/025; C08L 2207/06; C08F 210/16; C08J 5/18; C08J 2323/08
See application file for complete search history.

(56) References Cited

U.S. PATENT DOCUMENTS 3,242,150 A 3/1966 Scoggin
3,324,093 A 6/1967 Alleman
(Continued)

FOREIGN PATENT DOCUMENTS

CN 1384844 A 12/2002
CN 105793298 A 7/2016
(Continued)

OTHER PUBLICATIONS

Chinese Application No. 202180087652.1, Office Action dated May 30, 2025.
(Continued)

*Primary Examiner* — Shane Fang
(74) *Attorney, Agent, or Firm* — Tarolli, Sundheim, Covell & Tummino LLP

(57) ABSTRACT

The present invention relates to a polyethylene composition comprising a multimodal linear low density ethylene copolymer, wherein the linear low density ethylene copolymer comprises fractions varying in lamella thicknesses and the ratio of the amount of the fractions having a lamella thick-
(Continued)

ness of not more than 11.8 nm to the amount of the fraction having a lamella thickness of from more than 11.8 nm to not more than 21.7 nm is in the range of from 1.30 to 1.60, an article, such as a film, comprising said polyethylene composition and the use of said polyethylene composition for the production of a blown film for greenhouse film applications, heavy duty shipping sack applications, lamination film applications, coalition shrink film applications, stand up pouch applications or pond liner applications.

14 Claims, 2 Drawing Sheets

(52) U.S. Cl.
CPC ....... *C08J 2323/08* (2013.01); *C08L 2203/16* (2013.01); *C08L 2205/025* (2013.01); *C08L 2207/066* (2013.01)

(56) References Cited

U.S. PATENT DOCUMENTS

| | | | |
|---|---|---|---|
| 3,374,211 | A | 3/1968 | Marwil et al. |
| 3,405,109 | A | 10/1968 | Rohlfing |
| 4,532,311 | A | 7/1985 | Fulks et al. |
| 4,543,399 | A | 9/1985 | Jenkins, III et al. |
| 4,578,879 | A | 4/1986 | Yokoyama et al. |
| 4,582,816 | A | 4/1986 | Miro |
| 4,621,952 | A | 11/1986 | Aronson |
| 4,803,251 | A | 2/1989 | Goode et al. |
| 4,855,370 | A | 8/1989 | Chirillo et al. |
| 4,933,149 | A | 6/1990 | Rhee et al. |
| 5,026,795 | A | 6/1991 | Hogan |
| 5,391,654 | A | 2/1995 | Ahvenainen et al. |
| 10,899,858 | B2 | 1/2021 | Wang et al. |
| 2013/0087362 | A1* | 4/2013 | Nilsson ............... C08L 2205/02 438/758 |

FOREIGN PATENT DOCUMENTS

| | | | |
|---|---|---|---|
| CN | 111315567 | A | 6/2020 |
| CN | 116685613 | A | 9/2023 |
| EP | 0038119 | A2 | 10/1981 |
| EP | 0188125 | A | 9/1987 |
| EP | 0250169 | B1 | 7/1988 |
| EP | 0479186 | A1 | 8/1992 |
| EP | 0560035 | A1 | 9/1993 |
| EP | 0579426 | A | 1/1994 |
| EP | 0600414 | A | 6/1994 |
| EP | 0684871 | A1 | 12/1995 |
| EP | 0688794 | A | 12/1995 |
| EP | 0696293 | A | 2/1996 |
| EP | 0699213 | A | 3/1996 |
| EP | 0707513 | A | 4/1996 |
| EP | 0721798 | A | 1/1997 |
| EP | 0891990 | A1 | 11/1999 |
| EP | 1310295 | A1 | 5/2003 |
| EP | 1378528 | A1 | 1/2004 |
| EP | 1415999 | A1 | 5/2004 |
| EP | 1591460 | A1 | 11/2005 |
| EP | 2799456 | A1 | 11/2014 |
| JP | 2010070591 | A | 4/2010 |
| WO | 1994/025495 | A1 | 11/1994 |
| WO | 2000/029452 | A | 5/2000 |
| WO | 2001/055230 | A1 | 8/2001 |
| WO | 2004/000902 | A1 | 12/2003 |
| WO | 2005/087261 | A1 | 9/2005 |
| WO | 2006/002778 | A1 | 1/2006 |
| WO | 2007/025640 | A1 | 3/2007 |
| WO | 2015/200743 | A1 | 12/2015 |
| WO | 2017/181424 | A1 | 10/2017 |
| WO | 2020/109289 | A1 | 6/2020 |

OTHER PUBLICATIONS

Definition of terms relating to the Non-Ultimate Mechanical Properties of Polymers Pure & Appl. Chem. vol. 70, pp. 701-754, 1998.
E-L. Heino, et al., "Rheological Characterization of Polyethylene Fractions" Theoretical and Applied Rheology, Aug. 17-21, 1992, pp. 360-362.
Eeav-Leena Heino, "The Influence of molecular structure on some rheological properties of polyethylene" Annual transactions of the Nordic Rheology Society, vol. 3, 1995.
Application No. 20217429.8, Extended European Search Report dated May 28, 2021.
Geldart, D., et al. "The Design of Distributors for Gas-Fluidized Beds", Powder Technology, 42 (1985) 67-78.
Geldart, D. "Gas Fluidization Technology" J. Wiley and Sons, 1996.
Klimke, Katja et al., "Optimisation and Application of Polyolefin Branch Quantification by Melt-State 13C NMR Spectroscopy" Macromol. Chem Phys. 2006, 207, 382-395.
Mandelkern, L., et al., "Thermodynamic Quantities Governing Melting" Chapter 11, pp. 165-186.
Müller, Alejandro J., et al. "Thermal fractionation of polymers" Prog. Polym. Sci. 30 (2005) 559-603.
Orin, A., et al.,Application of a Multiple Linear Regression Model to Fixed Bands IR Detector Data in GPC-IR Analysis of Polyolefins Macromol. Symp. 2009, 282, 65-70.
Parkinson, Matthew, et al., "Effect of Branch Length on 13C Nmr Relaxation Properties in Molten Poly[ethyleneco-(a-olefin)] Model Systems", Macromol. Chem Phys. 2007, 208, 2128-2133.
Encyclopedia of Polymer Science and Engineering, 2nd Edition., vol. 14, pp. 492-509.
Indian Application No. 202317049383, Office Action dated Jun. 11, 2025.
United Arab Emirates Application No. P6001641/2023, Office Action dated May 23, 2024.
Chinese Application No. 202280009341.8, Notice of Allowance dated Aug. 1, 2025.
Taiwanese Application No. 110148141, Office Action dated Aug. 16, 2022.

* cited by examiner

POLYETHYLENE COMPOSITION FOR FILM APPLICATIONS WITH IMPROVED TOUGHNESS AND STIFFNESS

The present invention relates to a polyethylene composition comprising a multimodal linear low density ethylene copolymer with a specific pattern of amounts of fractions varying in lamella thicknesses, an article, such as a film comprising said polyethylene composition and the use of said polyethylene composition for the production of a blown film in several heavy duty applications.

TECHNICAL BACKGROUND

Polyethylene compositions especially comprising linear low density ethylene copolymers (LLDPE) are especially suitable for film applications, such as films used for packaging or green house applications.

Industry trends in packaging are downgauging. In order to obtain packaging materials with reduced material thicknesses but equal material properties the innovative resins are needed with an improved balance of properties especially in behalf of stiffness and toughness. Improved stiffness and toughness balance helps in downgauging of film structures and helps in the overall sustainability goals of industry. To improve toughness, density of packaging materials needs to be lowered however lower density leads to lower stiffness, hence higher density MDPE and HDPE products are being used more and more in the packaging applications.

Another approach for improving the stiffness and toughness balance is to use higher alpha olefin comonomers like 1-hexene and 1-octene as comonomers in the polyethylene resins.

In greenhouse applications another property which has shown big benefits aside from an improved stiffness and toughness balance is haze. High haze leads to a better diffraction of light which has shown to improve the crop yield performance. Usually for greenhouse applications LLDPE products and highly branched high pressure low density polyethylene (LDPE) products are used.

A LLDPE film with high haze and improved stiffness-toughness property balance using 1-butene comonomer as cost efficient alternative to use higher alpha olefin comonomers are not easily available to in the market. So far, it has not been possible to obtain the desired toughness properties for films designed for certain applications, for example, high dart drop impact (DDI), using 1-butene comonomer.

WO 2004/000902 A1 discloses a polyethylene composition comprising a bimodal LLDPE with 1-butene comonomer, which shows sufficient stiffness properties but inferior toughness.

Thus, there is a need in the art for polyethylene compositions comprising a linear low density polyethylene which can be produced cost effectively with an improved balance of properties as regards high stiffness, high toughness and high haze.

It has surprisingly been found that when carefully adapting the molecular design of a multimodal linear low density ethylene copolymer as such that the copolymer has a specific lamella thickness distribution a polyethylene composition can be obtained which shows an improved balance of properties as regards high stiffness as indicated in good tensile properties, high toughness as indicated in high puncture resistance and especially high dart drop impact and high haze. Additionally, the polyethylene compositions of the invention show good processability as indicated in high melt flow rates and rheological properties.

SUMMARY OF THE INVENTION

The present invention relates to a polyethylene composition comprising a multimodal linear low density ethylene copolymer, wherein the linear low density ethylene copolymer comprises fractions varying in lamella thicknesses and the ratio of the amount of the fractions having a lamella thickness of not more than 11.8 nm to the amount of the fraction having a lamella thickness of from more than 11.8 nm to not more than 21.7 nm is in the range of from 1.30 to 1.60, more preferably from 1.35 to 1.55 and most preferably from 1.40 to 1.50.

Further, the present invention relates to an article, preferably a film, more preferably a multilayer film, still more preferably a multilayer blown film, comprising the polyethylene composition as described above or below.

Still further, the present invention relates to the use of the polyethylene composition as described above or below for the production of a blown film for greenhouse film applications, heavy duty shipping sack applications, lamination film applications, coalition shrink film applications, stand up pouch applications or pond liner applications.

Definitions

A polyethylene composition according to the present invention denotes a polymer derived from more than 50 mol-% ethylene monomer units and optionally additional comonomer units.

The term 'copolymer' denotes a polymer derived from ethylene monomer units and additional comonomer units in an amount of more than 0.05 mol %.

A polyethylene composition or base resin comprising more than one fraction differing from each other in at least one property, such as weight average molecular weight or comonomer content, is called "multimodal". If the multimodal polyethylene composition or base resin includes two different fractions, it is called "bimodal" and, correspondingly, if it includes three different fractions, it is called "trimodal". The form of the molecular weight distribution curve, i.e. the appearance of the graph of the polymer weight fraction as function of its molecular weight, of such a multimodal polyethylene composition or base resin will show two or more maxima depending on the modality or at least be distinctly broadened in comparison with the curves of the individual fractions (see FIG. 3).

In the present invention the two ethylene-1-butene copolymer fractions preferably differ not only in their molecular weights which can been in their melt flow rates $MFR_2$ and graph of the polymer weight fraction as function of its molecular weight but also in their 1-butene contents.

Percentages are usually given herein as weight-% (wt %) if not stated otherwise.

DETAILED DESCRIPTION OF THE INVENTION

Polyethylene Composition

Figure 1:
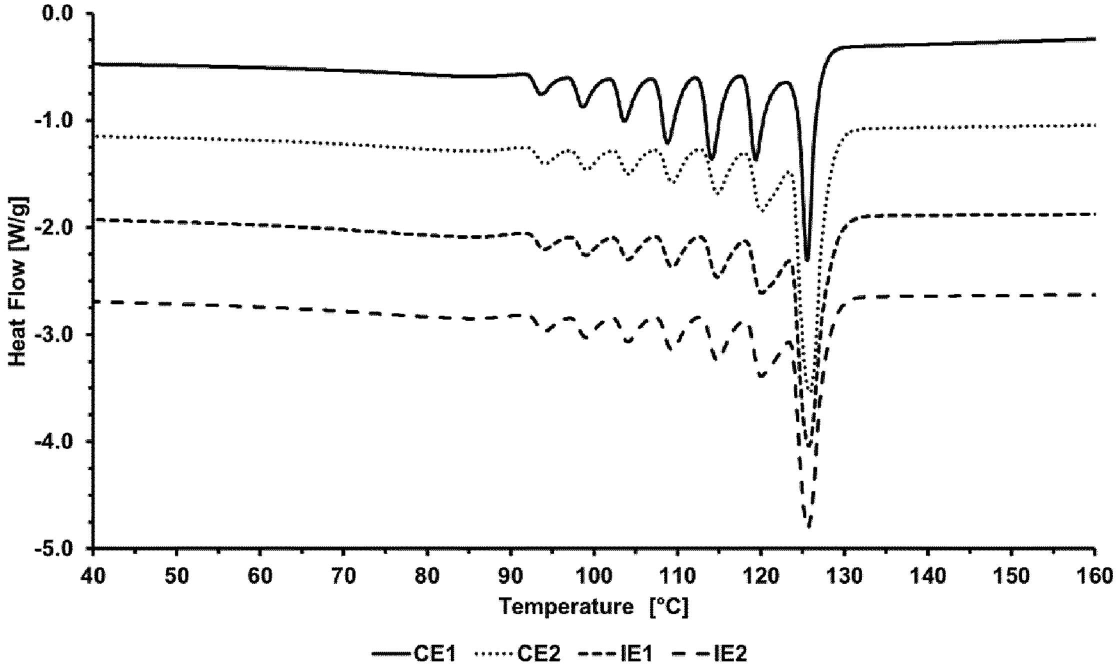
FIG. 1 shows the DSC melting curves of the compositions of examples CE1, CE2, IE1 and IE2 after subjecting the samples to the SSA protocol.

The present invention relates to a polyethylene composition comprising a multimodal linear low density ethylene copolymer, wherein the linear low density ethylene copolymer comprises fractions varying in lamella thicknesses and the ratio of the amount of the fractions having a lamella thickness of not more than 11.8 nm to the amount of the fraction having a lamella thickness of from more than 11.8 nm to not more than 21.7 nm is in the range of from 1.30 to 1.60, more preferably from 1.35 to 1.55 and most preferably from 1.40 to 1.50.

Further, the amount of the fraction having a lamella thickness of more than 11.8 nm to not more than 21.7 nm is preferably from 35.0 to 60.0 mol %, more preferably from 37.5 to 50.0 mol %, most preferably from 40.0 to 44.0 mol % of the total amount of the linear low density ethylene copolymer.

Still further, the amount of the fraction having a lamella thickness of not more than 5.0 nm is preferably from 17.0 to 30.0 mol %, more preferably from 17.5 to 25.0 mol %, most preferably from 18.0 to 20.0 mol % of the total amount of the linear low density ethylene copolymer.

Furthermore, the amount of the fraction having a lamella thickness of not more than 4.2 nm is preferably at least 8.5 mol %, more preferably from 8.5 to 15.0 mol %, still more preferably from 9.0 to 13.5 mol %, most preferably from 10.0 to 12.5 mol % of the total amount of the linear low density ethylene copolymer.

Additionally, the ratio of the amount of the fraction having a lamella thickness of not more than 4.2 nm to the amount of the fraction having a lamella thickness of more than 11.8 nm to not more than 21.7 nm of the linear low density ethylene copolymer is preferably in the range of from 0.20 to 0.30, more preferably from 0.22 to 0.29 and most preferably from 0.24 to 0.28.

Further, the ratio of the amount of the fraction having a lamella thickness of not more than 4.2 nm to the amount of the fraction having a lamella thickness of from more than 5.0 nm to not more than 6.1 nm of the linear low density ethylene copolymer is preferably in the range of from 0.85 to 1.15, more preferably from 0.90 to 1.10 and most preferably from 0.95 to 1.05.

The amounts of the fractions having different lamella thicknesses are given in weight-% (wt %).

The amounts of the fractions having different lamella thicknesses are usually measured by Successive Self-nucleation and Annealing (SSA) thermal fractionation technique that can be run on a Differential Scanning Calorimeter (DSC) as described below in the measurement method section.

The SSA technique consists of sequential application of self-nucleation and annealing steps to a polymer sample. After thermal conditioning (multiple heating and cooling cycles), a final DSC heating run reveals the distribution of melting temperatures induced by the SSA thermal treatment as a result of the heterogeneous nature of the chain structure of the polymer under analysis. The SSA technique is particularly useful to study the degree and distribution of short chain branches produced by the copolymerization of ethylene with alpha-olefins.

The polyethylene composition comprises the linear low density ethylene copolymer. In one embodiment the polyethylene composition can further comprise other polymers, which are different from the linear low density ethylene copolymer. The amount of said other polymers, if present, is preferably in the range of from 0.5 to 15.0 wt %, more preferably from 1.0 to 10.0 wt %, based on the total weight amount of the polyethylene composition.

It is, however, preferred that the linear low density ethylene copolymer is the only polymeric component of the polyethylene composition.

The linear low density ethylene copolymer is preferably present in the polyethylene composition in an amount of from 90.00 to 100 wt %, more preferably from 92.50 to 99.99 wt % and most preferably from 99.00 wt % to 99.90 wt %, based on the total weight of the polyethylene composition.

The polyethylene composition can further contain additives and/or fillers. It is noted herein that additives may be present in the polymer of ethylene (a) and/or mixed with the polymeric component(s) in a compounding step for producing the polyethylene composition. Examples of such additives are, among others, antioxidants, process stabilizers, UV-stabilizers, pigments, fillers, antistatic additives, antiblock agents, nucleating agents, acid scavengers, slip agent as well as polymer processing agent (PPA). Preferably, the total amount of these additives is 1.0 wt % or below, more preferably 0.5 wt % or below, most preferably 0.25 wt % or below, of the polyethylene composition.

It is understood herein that any of the additives and/or fillers can optionally be added in so called master batch which comprises the respective additive(s) together with a carrier polymer. In such case the carrier polymer is not calculated to the polymeric component(s) of the polyethylene composition, but to the amount of the respective additive(s), based on the total amount of polyethylene composition.

The linear low density ethylene copolymer is a multimodal linear low density ethylene copolymer, preferably a bimodal linear low density ethylene copolymer.

The linear low density ethylene copolymer preferably comprises, more preferably consists of two ethylene copolymer fractions which differ in their molecular weight, i.e. a low molecular weight ethylene copolymer fraction and a high molecular weight ethylene copolymer fraction, wherein the low molecular weight ethylene copolymer fraction has a lower molecular weight than the high molecular weight ethylene copolymer fraction.

The lower molecular weight can be seen e.g. in a higher melt flow rate of the low molecular weight ethylene copolymer fraction compared to the high molecular weight ethylene copolymer fraction or in the two or more maxima in the GPC curve depending on the modality or at least a distinctly broadened GPC curve in comparison with the GPC curves of the individual fractions (as exemplified in FIG. 3) The low molecular weight ethylene copolymer fraction preferably has a melt flow rate $MFR_2$ (190° C., 2.16 kg load) of from 200 to 500 g/10 min, more preferably from 225 to 400 g/10 min and most preferably from 250 to 350 g/10 min.

The linear low density ethylene copolymer preferably has a melt flow rate $MFR_5$ (5 kg, 190° C.) of from 0.40 to 0.85 g/10 min, more preferably from 0.50 to 0.80 g/10 min and most preferably from 0.55 to 0.70 g/10 min.

The weight ratio of the low molecular weight ethylene copolymer fraction and the high molecular weight ethylene copolymer fraction in the linear low density ethylene copolymer is preferably from 25.0:75.0 to 44.0:56.0, more preferably from 30.0:70.0 to 42.0:58.0 still more preferably from 35.0:65.0 to 40.5:59.5 and most preferably from 37.5:62.5 to 40.0 to 60.0.

Further, the weight amount of the high molecular weight ethylene copolymer fraction is preferably in the range of from 56.0 to 75.0 wt %, more preferably from 58.0 to 70.0 wt %, still more preferably from 59.5 to 65.0 wt %, and most preferably from 60.0 to 62.5 wt % of the total weight of the linear low density ethylene copolymer.

Additionally, the ratio of the number of short chain branches/1000 carbon atoms (SCB/1000 C) in the polymeric chain of the high molecular weight ethylene copolymer fraction is preferably in the range of from 15.0 to 35.0%, more preferably from 16.0 to 32.5% and most preferably from 17.5 to 30.0%.

The ratio of the number of short chain branches/1000 carbon atoms (SCB/1000 C) indicates the comonomer content of the polymeric fraction.

It is preferred that the high molecular weight ethylene copolymer fraction has a higher comonomer content than the low molecular weight ethylene copolymer fraction.

The comonomers of the linear copolymer are preferably selected from alpha-olefins having from 3 to 12 carbon atoms, more preferably from 4 to 8 carbon atoms, such as 1-butene, 1-hexene or 1-octene. Mostly preferred is 1-butene.

Preferably the low molecular weight ethylene copolymer fraction and the high molecular weight ethylene copolymer fraction comprise the same comonomers.

The lower comomoner content of the low molecular weight ethylene copolymer fraction can be seen in a higher density compared to the density of the linear low density ethylene copolymer.

The low molecular weight ethylene copolymer fraction preferably has a density of 935 to 960 kg/m$^3$, more preferably from 940 to 957 kg/m$^3$ and most preferably from 945 to 955 kg/m$^3$.

The linear low density ethylene copolymer preferably has a density of from 915.0 to 925.0 kg/m$^3$, more preferably from 917.0 to 923.5 kg/m$^3$ and most preferably of from 919.0 to 922.0 kg/m$^3$.

The polyethylene composition is characterized by the following properties:

$MFR_2$

The polyethylene composition preferably has a melt flow rate $MFR_2$ (190° C., 2.16 kg) of from 0.05 to 0.22 g/10 min, more preferably from 0.10 to 0.20 g/10 min and most preferably from 0.12 to 0.18 g/10 min, determined according to ISO 1133.

$MFR_5$

The polyethylene composition preferably has a melt flow rate $MFR_5$ (190° C., 5 kg) of from 0.40 to 0.85 g/10 min, more preferably from 0.50 to 0.80 g/10 min and most preferably from 0.55 to 0.70 g/10 min, determined according to ISO 1133.

$MFR_{21}$

The polyethylene composition preferably has a melt flow rate $MFR_{21}$ (190° C., 21.6 kg) of from 10.0 to 20.0 g/10 min, more preferably from 12.0 to 18.0 g/10 min and most preferably from 13.5 to 17.0 g/10 min, determined according to ISO 1133.

$FRR_{21/2}$

The polyethylene composition preferably has a flow rate ratio $FRR_{21/2}$, being the ratio of $MFR_{21}$ to $MFR_2$, of from 70 to 125, more preferably of from 80 to 110, and most preferably of from 90 to 100.

$FRR_{21/5}$

The polyethylene composition preferably has a flow rate ratio $FRR_{21/5}$, being the ratio of $MFR_{21}$ to $MFR_5$, of from 10.0 to 20.0, more preferably from 12.5 to 17.5 and most preferably from 13.5 to 16.5.

Weight Average Molecular Weight Mw

The polyethylene composition preferably has a weight average molecular weight Mw of from 185,000 to 250,000 g/mol, more preferably from 190,000 to 235,000 g/mol and most preferably from 195,000 to 220,000 g/mol.

Z Average Molecular Weight Mz

The polyethylene composition preferably has a z average molecular weight Mz of from 1,000,000 to 1,500,000 g/mol, more preferably from 1,050,000 to 1,400,000 g/mol and most preferably from 1,100,000 to 1,300,000 g/mol.

Molecular Weight Distribution Mw/Mn

The polyethylene composition has a polydispersity index PDI, being the ratio of weight average molecular weight Mw to number average molecular weight Mn, Mw/Mn, in the range of from 10.0 to 20.0, more preferably from 12.0 to 18.0 and most preferably from 13.0 to 17.0.

Molecular Weight Distribution Mz/Mw

The polyethylene composition has a polydispersity index PDI, being the ratio of z average molecular weight Mz to weight average molecular weight Mw, Mw/Mw, in the range of 3.0 to 8.0, more preferably in the range of 3.5 to 7.5 and most preferably in the range of 4.0 to 6.0.

Density

The polyethylene composition preferably has a density of from 915.0 to 925.0 kg/m$^3$, more preferably from 917.0 to 923.5 kg/m$^3$ and most preferably of from 919.0 to 922.0 kg/m$^3$, determined according to ISO 1183-1:2004.

The density of the base resin is mainly influenced by the amount and type of comonomer. In addition to that, the nature of the polymer originating mainly from the catalyst used as well as the melt flow rate play a role.

The polyethylene composition is further characterized by specific rheological properties.

$eta_{0.05}$

The polyethylene composition preferably has a complex viscosity at 0.05 rad/s $eta_{0.05}$ of from 50,000 to 100,000 Pa·s, more preferably from 55,000 to 85,000 Pa·s and most preferably from 60,000 to 75,000 Pa·s.

The viscosity $eta_{0.05}$ is measured at a low frequency and thus a low shear stress and is proportional to the molecular weight of the composition. It can thus be seen as a measure for the molecular weight of the polyethylene composition.

$eta_{300}$

The polyethylene composition preferably has a complex viscosity at 300 rad/s $eta_{300}$ of from 925 to 1250 Pa·s, more preferably from 950 to 1200 Pa·s and most preferably from 975 to 1100 Pa·s.

The viscosity $eta_{300}$ is measured at a high frequency and thus a high shear stress and is inversely proportional to the flowability of the composition. It can thus be seen as a measure for the processability of the polyethylene composition.

Viscosity at a Constant Shear Stress of 747 Pa $Eta_{747}$

The polyethylene composition preferably has a viscosity at a constant shear stress of 747 Pa $eta_{747}$ of from 70 to 150 kPa·s, more preferably from 80 to 135 kPa·s and most preferably from 85 to 125 kPa·s.

The viscosity at a constant shear stress of 747 Pa $eta_{747}$ is influenced by the weight average molecular weight.

Shear Thinning Index $SHI_{2.7/210}$

The polyethylene composition preferably has a shear thinning index $SHI_{2.7/210}$ being the ratio of the complex shear modulus of 2.7 kPa to the complex shear modulus of 210 kPa, of from 10 to 20, more preferably of from 11 to 19 and mot preferably of from 12 to 18.

Shear Thinning Index $SHI_{5/200}$

The polyethylene composition preferably has a shear thinning index $SHI_{5/200}$ being the ratio of the complex shear modulus of 5 kPa to the complex shear modulus of 200 kPa, of from 15.0 to 35.0, more preferably from 17.5 to 32.5 and most preferably from 20.0 to 30.0.

Shear Thinning Index $SH_{2.7/210}$

The polyethylene composition preferably has a shear thinning index $SHI_{2.7/210}$ being the ratio of the complex shear modulus of 2.7 kPa to the complex shear modulus of 210 kPa, of from 20.0 to 40.0, more preferably from 22.5 to 37.5 and most preferably from 25.0 to 35.0.

The shear thinning indices are ratios of complex shear moduli at the upper and lower and of the rheological frequency curves and thus can be seen as rheological measures for the polydispersity.

The rheological properties, such as $SHI_{2.7/210}$, $SHI_{5/200}$, $eta_{0.05}$, $eta_{300}$ and $eta_{747}$ described above, have been determined on the polyethylene composition which differs from the polymeric components, preferably the linear low density ethylene copolymer, by comprising additional components such as additives. These properties, however, can also be determined on the polymeric components, preferably the linear low density ethylene copolymer, which has been stabilized with a stabilizer package. The rheological properties determined on the polymeric components, preferably the linear low density ethylene copolymer, are preferably in the same ranges as when determined on the polyethylene composition.

Article

In yet a further aspect, the present invention is concerned with an article comprising, preferably consisting of the polyethylene composition as described above or below.

The article preferably is a film, or a blow molded article.

It is especially preferred that the article is a film, such as a blown film or a cast film, preferably a multi-layered film such as a multi-layered blown film or a multi-layered cast film, especially preferably a multi-layered blown film. In a multi-layered film the polyethylene composition is preferably comprised in one or more or all layers of the multi-layered film. It is especially preferred that all one or more or all layers of the multi-layered film consist of the polyethylene composition as described above or below.

The article, preferably film, is especially suitable for heavy duty applications such as greenhouse film applications, heavy duty shipping sack applications, lamination film applications, coalition shrink film applications, stand up pouch applications or pond liner applications.

The films preferably have a thickness of from 10 μm to 100 μm, more preferably from 20 to 75 μm and most preferably from 30 to 50 μm.

In some embodiments the thickness of the films can be up to 500 μm, more preferably up to 350 μm and most preferably up to 250 μm.

It has surprisingly been found that an article, preferably a film, comprising, preferably consisting of the polyethylene composition as described above or below shows an improved balance of properties in regard of stiffness, shown in tensile properties, toughness, especially shown in e.g. dart drop strength, optical properties, especially shown in haze and processability shown in the rheological properties of the polyethylene composition.

Films comprising the polyethylene composition according to the invention are preferably characterized by the following properties:

Tensile Modulus in Machine Direction (TM-MD)

A film comprising the polyethylene composition according to the invention preferably has a tensile modulus in machine direction (TM-MD) of at least 275 MPa, more preferably at least 300 MPa, most preferably at least 315 MPa, when measured on a 40 μm blown film according to ASTM D882 at a test speed of 5 mm/min and a strain of 1%. The upper limit of the tensile modulus in machine direction is usually not higher than 500 MPa, preferably not higher than 400 MPa.

Tensile Modulus in Transverse Direction (TM-TD)

A film comprising the polyethylene composition according to the invention preferably has a tensile modulus in transverse direction (TM-TD) of at least 350 MPa, more preferably at least 375 MPa, and most preferably at least 400 MPa, when measured on a 40 μm blown film according to ASTM D882 at a test speed of 5 mm/min and a strain of 1%. The upper limit of the tensile modulus in transverse direction is usually not higher than 500 MPa, preferably not higher than 450 MPa.

Tensile Stress at Break in Machine Direction (TSB-MD)

A film comprising the polyethylene composition according to the invention preferably has a tensile stress at break in machine direction (TSB-MD) of at least 50 MPa, more preferably at least 55 MPa, and most preferably at least 60 MPa, when measured on a 40 μm blown film according to ISO 527-3:1996 at a test speed of 500 mm/min. The upper limit of the tensile stress at break in machine direction is usually not higher than 100 MPa, preferably not higher than 80 MPa.

Tensile Stress at Break in Transverse Direction (TSB-TD)

A film comprising the polyethylene composition according to the invention preferably has a tensile stress at break in transverse direction (TSB-TD) of at least 30 MPa, more preferably at least 35 MPa, and most preferably at least 402 MPa, when measured on a 40 μm blown film according to ISO 527-3:1996 at a test speed of 500 mm/min. The upper limit of the tensile stress at break in transverse direction is usually not higher than 75 MPa, preferably not higher than 60 MPa.

Tensile Stress at Yield in Machine Direction (TSY-MD)

A film comprising the polyethylene composition according to the invention preferably has a no tensile stress at yield in machine direction (TSY-MD), when measured on a 40 μm blown film according to ISO 527-3:1996 at a test speed of 500 mm/min.

Tensile Stress at Yield in Transverse Direction (TSY-TD)

A film comprising the polyethylene composition according to the invention preferably has a tensile stress at yield in transverse direction (TSY-TD) of at least 8.0 MPa, more preferably at least 9.0 MPa, and most preferably at least 10.0 MPa, when measured on a 40 μm blown film according to ISO 527-3:1996 at a test speed of 500 mm/min. The upper limit of the tensile stress at yield in transverse direction is usually not higher than 30 MPa, preferably not higher than 20 MPa.

Elongation at Break in Machine Direction (EB-MD)

A film comprising the polyethylene composition according to the invention preferably has an elongation at break in machine direction (EB-MD) of at least 300%, more preferably at least 350%, and most preferably at least 400%, when measured on a 40 μm blown film according to ISO 527-3: 1996 at a test speed of 500 mm/min. The upper limit of the elongation at break in machine direction is usually not higher than 600%, preferably not higher than 500%.

Elongation at Break in Transverse Direction (EB-TD)

A film comprising the polyethylene composition according to the invention preferably has an elongation at break in transverse direction (EB-TD) of at least 600%, more preferably at least 650%, and most preferably at least 700%, when measured on a 40 μm blown film according to ISO 527-3:1996 at a test speed of 500 mm/min. The upper limit of the elongation at break in transverse direction is usually not higher than 900%, preferably not higher than 800%.

Elmendorf Tear Strength in Machine Direction (TS-MD)

A film comprising the polyethylene composition according to the invention preferably has an Elmendorf tear strength in machine direction (TS-MD) of at least 2.0 N, more preferably at least 3.0 N, and most preferably at least 5.0 N, when measured on a 40 μm blown film according to ISO 6383-2:1983. The upper limit of Elmendorf tear strength in machine direction is usually not higher than 10.0 N, preferably not higher than 7.5 N.

Elmendorf Tear Strength in Transverse Direction (TS-TD)

A film comprising the polyethylene composition according to the invention preferably has an Elmendorf tear strength in transverse direction (TS-TD) of at least 7.0 N, more preferably at least 8.5 N, and most preferably at least 10.0 N, when measured on a 40 μm blown film according to ISO 6383-2:1983. The upper limit of Elmendorf tear strength in transverse direction is usually not higher than 20.0 N, preferably not higher than 15.0 N.

Puncture Resistance-Force (PRF)

A film comprising the polyethylene composition according to the invention preferably has a puncture resistance-force (PRF) of at least 30 N, more preferably at least 35 N, and most preferably at least 40 N, when measured on a 40 μm blown film. The upper limit of the puncture resistance-force (PRF) is usually not higher than 60 N, preferably not higher than 55 N.

Puncture Resistance Energy (PRE)

A film comprising the polyethylene composition according to the invention preferably has a puncture resistance-energy (PRE) of at least 1.2 J, more preferably at least 1.5 J, and most preferably at least 1.8 J, when measured on a 40 μm blown film. The upper limit of the puncture resistance-energy (PRE) is usually not higher than 5.0 J, preferably not higher than 3.5 J.

Dart Drop Impact (DDI)

A film comprising the polyethylene composition according to the invention preferably has a dart drop impact (DDI) of at least 250 g, preferably at least 300 g, most preferably at least 400 g, when measured on a 40 μm blown film. The upper limit of the dart drop impact is usually not more than 500 g, preferably not more than 450 g.

Haze

A film comprising the polyethylene composition according to the invention preferably has a haze of at least 75.0%, preferably at least 80.0%, most preferably at least 84.0%, when measured on a 40 μm blown film. The upper limit of the dart drop impact is usually not more than 92.0%, preferably not more than 90.0%.

Gloss

A film comprising the polyethylene composition according to the invention preferably has a gloss at 200 of at least 0.2%, preferably at least 0.4%, most preferably at least 0.5%, when measured on a 40 μm blown film. The upper limit of the dart drop impact is usually not more than 1.5%, preferably not more than 1.0%.

A film comprising the polyethylene composition according to the invention preferably has a gloss at 60° of at least 5.0%, preferably at least 6.0%, most preferably at least 7.5%, when measured on a 40 μm blown film. The upper limit of the dart drop impact is usually not more than 20.0%, preferably not more than 15.0%.

A film comprising the polyethylene composition according to the invention preferably has a gloss at 85° of at least 25.0%, preferably at least 30.0%, most preferably at least 35.0%, when measured on a 40 μm blown film. The upper limit of the dart drop impact is usually not more than 60.0%, preferably not more than 50.0%.

Process

The multimodal linear low density ethylene copolymer of the polyethylene composition is preferably produced in a process, wherein at least two linear low density ethylene copolymer fractions are polymerized in a multistage process in at least two sequential reactor stages in any order in the presence of a polymerization catalyst, preferably a Ziegler-Natta polymerization catalyst.

Polymerization Catalyst

The preferred polymerisation catalyst is a Ziegler-Natta polymerization catalyst, which preferably contains a magnesium compound, an aluminium compound and a titanium compound supported on a particulate support.

The particulate support can be an inorganic oxide support, such as silica, alumina, titania, silica-alumina and silica-titania. Preferably, the support is silica.

The average particle size of the silica support can be typically from 10 to 100 μm. However, it has turned out that special advantages can be obtained if the support has an average particle size from 15 to 30 μm, preferably from 18 to 25 μm. Especially it has been found out that the average particle size of the polymer produced in the process of the invention is the same irrespective whether the catalyst is prepared on a 20 μm support or on a 40 μm support. In fact, the fraction of fine polymer particles has been found to be lower if a support having an average particle size of 20 μm is used. The reduction of the fine polymer reduces the risk of plugging and thus contributes to a stable process operation. This, on the other hand, helps to produce polymer films with a good homogeneity. Examples of suitable support materials are, for instance, ES747JR produced and marketed by Ineos Silicas (former Crossfield), and SP9-491, produced and marketed by Grace.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794. Alternatively, it can be prepared by first preparing a solution from the components and then contacting the solution with a carrier, as described in WO-A-01/55230.

Further suitable catalysts are described in EP 2 799 456.

The above mentioned solid catalyst component is contacted with an aluminium alkyl cocatalyst, which preferably is an aluminium trialkyl compound, after which it can be used in polymerisation. The contacting of the solid catalyst component and the aluminium alkyl cocatalyst can either be conducted prior to introducing the catalyst into the polymerisation reactor, or it can be conducted by introducing the two components separately into the polymerisation reactor.

Process Details:

The process for producing the polyethylene composition according to the present invention preferably comprises the following steps:

a) polymerizing ethylene and at least one comonomer selected from alpha-olefins having from 3 to 12 carbon atoms in the presence of a polymerization catalyst in a first polymerization reactor for producing a first intermediate material comprising the low molecular weight ethylene copolymer fraction;
b) transferring the first intermediate material into a second polymerization reactor;
c) polymerizing ethylene and at least one comonomer selected from alpha-olefins having from 3 to 12 carbon atoms in the presence of the first intermediate material for producing a high molecular weight ethylene copolymer fraction;
d) obtaining a multimodal linear low density ethylene copolymer comprising the low molecular weight ethylene copolymer fraction and the high molecular weight ethylene copolymer fraction from the last polymerization reactor;
e) compounding the base resin to obtain the polyethylene composition.

The first intermediate material preferably comprises the low molecular weight ethylene copolymer fraction as defined above or below.

The preferred alpha-olefin comonomer used in both polymerization reactors is 1-butene.

The linear low density ethylene copolymer preferably comprises the low molecular weight ethylene copolymer fraction and the high molecular weight ethylene copolymer fraction as defined above or below.

The multimodal linear low density ethylene copolymer and the polyethylene composition are preferably defined by the properties of the base resin and the polyethylene composition described above or in the claims.

The temperature in the first reactor, preferably the first slurry phase reactor, more preferably the first loop reactor, is typically from 50 to 115° C., preferably from 60 to 110° C. and in particular from 70 to 100° C. The pressure is typically from 1 to 150 bar, preferably from 1 to 100 bar.

The slurry phase polymerization may be conducted in any known reactor used for slurry phase polymerization. Such reactors include a continuous stirred tank reactor and a loop reactor. It is especially preferred to conduct the polymerization in a loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479 186 and U.S. Pat. No. 5,391,654.

It is sometimes advantageous to conduct the slurry phase polymerization above the critical temperature and pressure of the fluid mixture. Such operations are described in U.S. Pat. No. 5,391,654. In such an operation the temperature is typically at least 85° C., preferably at least 90° C. Furthermore the temperature is typically not higher than 110° C., preferably not higher than 105° C. The pressure under these conditions is typically at least 40 bar, preferably at least 50 bar. Furthermore, the pressure is typically not higher than 150 bar, preferably not higher than 100 bar. In a preferred embodiment the slurry phase polymerization step, is carried out under supercritical conditions whereby the reaction temperature and reaction pressure are above equivalent critical points of the mixture formed by hydrocarbon medium, monomer, hydrogen and comonomer and the polymerization temperature is lower than the melting temperature of the polymer formed.

The slurry may be withdrawn from the slurry phase reactor either continuously or intermittently. A preferred way of intermittent withdrawal is the use of settling legs where the slurry is allowed to concentrate before withdrawing a batch of the concentrated slurry from the reactor. The use of settling legs is disclosed, amongst others, in U.S. Pat. Nos. 3,374,211, 3,242,150 and EP-A-1 310 295. Continuous withdrawal is disclosed, amongst others, in EP-A-891 990, EP-A-1 415 999, EP-A-1 591 460 and WO-A-2007/025640. The continuous withdrawal is advantageously combined with a suitable concentration method as disclosed in EP-A-1 415 999 and EP-A-1 591 460.

Settling legs are used to concentrate the slurry that is withdrawn from the reactor. The withdrawn stream thus contains more polymer per volume than the slurry within the reactor in average. This has the benefit that less liquid needs to be recycled back to the reactor and thereby the costs of the equipment are lower. In commercial scale plants the fluid which is withdrawn with the polymer evaporates in a flash tank and from there it is compressed with a compressor and recycled into the slurry phase reactor.

However, the settling legs withdraw the polymer intermittently. This causes the pressure and also other variables in the reactor to fluctuate with the period of the withdrawal. Also the withdrawal capacity is limited and depends on the size and number of settling legs. To overcome these disadvantages continuous withdrawal is often preferred.

The continuous withdrawal, on the other hand, has the problem that it typically withdraws the polymer in the same concentration as it is present within the reactor. To reduce the amount of hydrocarbons to be compressed the continuous outlet is advantageously combined with a suitable concentration device, such as a hydrocyclone or sieve, as disclosed in EP-A-1 415 999 and EP-A-1 591 460. The polymer-rich stream is then directed to a flash and the polymer-lean steam is returned directly into the reactor.

For adjusting the melt flow rate of the polyethylene fraction polymerized in the slurry phase reactor preferably hydrogen is introduced into the reactor.

The hydrogen feed in the first reaction stage is preferably adjusted to the ethylene feed in order to fulfil a hydrogen to ethylene ratio in the first slurry phase reactor of 250 to 500 mol/kmol, more preferably of 300 to 400 mol/kmol.

For adjusting the comomoner content and density of the polyethylene fraction polymerized in the slurry phase reactor preferably alpha-olefin comonomer, preferably 1-butene, is introduced into the reactor.

The hydrogen feed in the first reaction stage is preferably adjusted to the ethylene feed in order to fulfil a comomoner to ethylene ratio, preferably 1-butene to ethylene ratio, in the first slurry phase reactor of 575 to 750 mol/kmol, more preferably of 600 to 700 mol/kmol.

The polyethylene fraction produced in the first slurry phase reactor is usually an ethylene copolymer fraction.

The residence time and the polymerization temperature in the first slurry phase reactor are adjusted as such as to polymerize an ethylene copolymer fraction typically in an amount of 25.0 to 44.0 wt %, preferably 30.0 to 42.0 wt %, more preferably 35.0 to 40.0 wt % and most preferably 37.5 to 40.0 wt % of the linear low density ethylene copolymer.

Before directing the polymer slurry to the second polymerization reactor it can be subjected to a purging step for substantially removing hydrocarbons from the polymer slurry. The purging step is preferably conducted in a flash vessel operated at a pressure of 2 to 10 bar and a temperature of 50 to 100° C. After applying the purging step, the first intermediate material produced in the first slurry reactor preferably is transferred to a second reactor, preferably a gas phase reactor, more preferably a fluidized bed gas phase reactor.

In a fluidised bed gas phase reactor an olefin is polymerized in the presence of a polymerization catalyst in an upwards moving gas stream. The reactor typically contains a fluidised bed comprising the growing polymer particles containing the active catalyst located above a fluidisation grid.

The polymer bed is fluidised with the help of a fluidisation gas comprising the olefin monomer, eventually comonomer (s), eventually chain growth controllers or chain transfer agents, such as hydrogen, and eventually inert gas. The inert gas can thereby be the same or different as the inert gas used in the slurry phase reactor. The fluidisation gas is introduced into an inlet chamber at the bottom of the reactor. To make sure that the gas flow is uniformly distributed over the cross-sectional surface area of the inlet chamber the inlet pipe may be equipped with a flow dividing element as known in the art, e. g. U.S. Pat. No. 4,933,149 and EP-A-684 871.

From the inlet chamber the gas flow is passed upwards through the fluidisation grid into the fluidised bed. The purpose of the fluidisation grid is to divide the gas flow evenly through the cross-sectional area of the bed. Sometimes the fluidisation grid may be arranged to establish a gas stream to sweep along the reactor walls, as disclosed in WO-A-2005/087261. Other types of fluidisation grids are disclosed, amongst others, in U.S. Pat. No. 4,578,879, EP 600 414 and EP-A-721 798. An overview is given in Geldart and Bayens: The Design of Distributors for Gas-fluidised Beds, Powder Technology, Vol. 42, 1985.

The fluidisation gas passes through the fluidised bed. The superficial velocity of the fluidisation gas must be higher than the minimum fluidisation velocity of the particles contained in the fluidised bed, as otherwise no fluidisation would occur. On the other hand, the velocity of the gas should be lower than the onset velocity of pneumatic transport, as otherwise the whole bed would be entrained with the fluidisation gas. The minimum fluidisation velocity and the onset velocity of pneumatic transport can be calculated when the particle characteristics are known by using common engineering practice. An overview is given, amongst others, in Geldart: Gas Fluidisation Technology, J. Wiley & Sons, 1996.

When the fluidisation gas is contacted with the bed containing the active catalyst the reactive components of the gas, such as monomers and chain transfer agents, react in the presence of the catalyst to produce the polymer product. At the same time the gas is heated by the reaction heat.

The unreacted fluidisation gas is then removed from the top of the reactor, compressed and recycled into the inlet chamber of the reactor. Prior to the entry into the reactor fresh reactants are introduced into the fluidisation gas stream to compensate for the losses caused by the reaction and product withdrawal. It is generally known to analyse the composition of the fluidisation gas and introduce the gas components to keep the composition constant. The actual composition is determined by the desired properties of the product and the catalyst used in the polymerization.

After that the gas is cooled in a heat exchanger to remove the reaction heat. The gas is cooled to a temperature which is lower than that of the bed to prevent the bed from being heated because of the reaction. It is possible to cool the gas to a temperature where a part of it condenses. When the liquid droplets enter the reaction zone they are vaporized. The vaporisation heat then contributes to the removal of the reaction heat. This kind of operation is called condensed mode and variations of it are disclosed, amongst others, in WO-A-2007/025640, U.S. Pat. No. 4,543,399, EP-A-699 213, and WO-A-94/25495. It is also possible to add condensing agents into the recycle gas stream, as disclosed in EP-A-696 293. The condensing agents are non-polymerizable components, such as propane, n-pentane, isopentane, n-butane or isobutane, which are at least partially condensed in the cooler.

The polymeric product may be withdrawn from the gas phase reactor either continuously or intermittently. Combinations of these methods may also be used.

Continuous withdrawal is disclosed, amongst others, in WO-A-00/29452.

Intermittent withdrawal is disclosed, amongst others, in U.S. Pat. No. 4,621,952, EP-A-188 125, EP-A-250 169 and EP-A-579 426.

The top part of the at least one gas phase reactor may include a so called disengagement zone. In such a zone the diameter of the reactor is increased to reduce the gas velocity and allow the particles that are carried from the bed with the fluidisation gas to settle back to the bed.

The bed level may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain time-averaged bed levels.

Also antistatic agent(s) may be introduced into the at least one gas phase reactor if needed. Suitable antistatic agents and methods to use them are disclosed, amongst others, in U.S. Pat. Nos. 5,026,795, 4,803,251, 4,532,311, 4,855,370 and EP-A-560 035. They are usually polar compounds and include, amongst others, water, ketones, aldehydes alcohols.

The reactor may include a mechanical agitator to further facilitate mixing within the fluidised bed. An example of suitable agitator design is given in EP-A-707 513.

The temperature in the gas phase polymerization in the gas phase reactor typically is at least 70° C., preferably at least 75° C. The temperature typically is not more than 105° C., preferably not more than 95° C. The pressure is typically at least 10 bar, preferably at least 15 bar but typically not more than 30 bar, preferably not more than 25 bar.

For adjusting the melt flow rate of the polyethylene fraction polymerized in the first gas phase reactor hydrogen is introduced into the reactor.

The hydrogen feed is preferably adjusted to the ethylene feed in order to fulfil a hydrogen to ethylene ratio in the gas phase reactor of 2.5 to 10.0 mol/kmol, more preferably of 3.5 to 9.0 mol/kmol and most preferably 5.0 to 7.5 mol/kmol.

In the gas phase reactor preferably an ethylene copolymer fraction is produced. The fluidisation gas stream thus comprises comonomers, preferably 1-butene. The comonomer used in the first gas phase reactor may be the same or different to that used in the slurry phase reactor, preferably is the same as used in the slurry phase reactor. The comonomer feed is preferably adjusted to the ethylene feed in order to fulfil a comonomer to ethylene ratio, preferably 1-butene to ethylene ratio, of at least 750 mol/kmol, more preferably 750 to 850 mol/kmol, most preferably 760 to 800 mol/kmol.

The residence time and the polymerization temperature in the gas phase reactor are adjusted as such as to polymerize an ethylene copolymer fraction typically in an amount of from 56.0 to 75.0 wt %, more preferably from 58.0 to 70.0 wt %, still more preferably from 59.5 to 65.0 wt %, and most preferably from 60.0 to 62.5 wt % of the total weight of the linear low density ethylene copolymer.

Further, the linear low density ethylene copolymer emerging from the gas phase reactor, preferably consisting of the low molecular weight ethylene copolymer fraction and the high molecular weight ethylene copolymer fraction preferably has a density of from 915.0 to 925.0 kg/m$^3$, more preferably from 917.0 to 923.5 kg/m$^3$ and most preferably of from 919.0 to 922.0 kg/m$^3$.

The polymerization of low molecular weight ethylene copolymer fraction and high molecular weight ethylene copolymer fraction in the first and second polymerization zones may be preceded by a prepolymerization step. The purpose of the prepolymerization is to polymerize a small amount of polymer onto the catalyst at a low temperature and/or a low monomer concentration. By prepolymerization it is possible to improve the performance of the catalyst in slurry and/or modify the properties of the final polymer. The prepolymerization step may be conducted in slurry or in gas phase. Preferably prepolymerization is conducted in slurry, preferably in a loop reactor. The prepolymerization is then preferably conducted in an inert diluent, preferably the diluent is a low-boiling hydrocarbon having from 1 to 4 carbon atoms or a mixture of such hydrocarbons.

The temperature in the prepolymerization step is typically from 0 to 90° C., preferably from 20 to 80° C. and more preferably from 50 to 75° C.

The pressure is not critical and is typically from 1 to 150 bar, preferably from 10 to 100 bar.

The polymerization catalyst can be fed to any polymerization stage but preferably is fed to the first polymerization stage or the prepolymerization stage, when present.

The catalyst components are preferably all introduced to the prepolymerization step. Preferably the reaction product of the prepolymerization step is then introduced to the first polymerization reactor. The prepolymer component is calculated to the amount of the component that is produced in the first actual polymerisation step after the prepolymerisation step, preferably to the amount of the low molecular weight ethylene polymer component.

Compounding

The polyethylene composition of the invention preferably is produced in a multi-stage process which further comprises a compounding step, wherein the multimodal linear low density ethylene copolymer, which is typically obtained as a powder from the reactor, is extruded in an extruder and then pelletized to polymer pellets in a manner known in the art to form the polyolefin composition of the invention.

Optionally, additives or other polymer components can be added to the composition during the compounding step in an amount as described above. Preferably, the multimodal linear low density ethylene copolymer obtained from the reactor is compounded in the extruder together with additives in a manner known in the art.

The extruder may be e.g. any conventionally used extruder. As an example of an extruder for the present compounding step may be those supplied by Japan Steel works, Kobe Steel or Farrel-Pomini, e.g. JSW 460P or JSW CIM90P.

Film Production

Polymeric films are usually produced by blown film extrusion or by cast film extrusion.

In the case of multi-layered films several layers of a film can be coextruded or laminated during blown film extrusion or cast film extrusion.

These processes are well known in the art and are easily adaptable for producing films comprising the polyethylene composition according to the present invention.

Use

The present invention further relates to the use of the polyethylene composition as described above or below for the production of a blown film for greenhouse film applications, heavy duty shipping sack applications, lamination film applications, coalition shrink film applications, stand up pouch applications or pond liner applications.

EXAMPLES

1. Determination Methods a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_5$ of polyethylene is measured at a temperature of 190° C. and a load of 5 kg, the $MFR_2$ of polyethylene at a temperature of 190° C. and a load of 2.16 kg and the $MFR_{21}$ of polyethylene is measured at a temperature of 190° C. and a load of 21.6 kg. The quantity FRR (flow rate ratio) denotes the ratio of flow rates at different loads. Thus, $FRR_{21/5}$ denotes the value of $MFR_{21}/MFR_5$.

The $MFR_2$ of the high molecular weight ethylene polymer component polymerized in the second polymerization reactor is calculated from the $MFR_2$ of the low molecular weight ethylene polymer component polymerized in the first polymerization reactor and the $MFR_2$ of the base resin as follows:

$$\mathrm{Log}MFR_{final} = \mathrm{wt}\ \%_{1st} \times \mathrm{Log}MFR_{1st} + \mathrm{wt}\ \%_{2nd} \times \mathrm{Log}MFR_{2nd}$$

wherein

"final" means "of the polyethylene resin"

"1st" means "of the polymer component produced in the first reactor

"2nd" means "of the polymer component produced in the second reactor.

b) Density

Density of the polymer was measured according to ISO 1183-1:2004 Method A on compression moulded specimen prepared according to EN ISO 1872-2 (February 2007) and is given in kg/m$^3$.

c) Comonomer Content $^{13}$C-NMR spectra were recorded on Bruker 400 MHz spectrometer at 130° C. from samples dissolved in 1, 2, 4-trichlorobenzene/benzene-d6 (90/10 w/w). Conversion between % wt and % mol can be carried out by calculation.

d) Rheological Parameters

The characterization of polymer melts by dynamic shear measurements complies with ISO standards 6721-1 and 6721-10. The measurements were performed on an Anton Paar MCR301 stress controlled rotational rheometer, equipped with a 25 mm parallel plate geometry. Measurements were undertaken on compression moulded plates using nitrogen atmosphere and setting a strain within the linear viscoelastic regime. The oscillatory shear tests were done at 190° C. applying a frequency range between 0.01 and 600 rad/s and setting a gap of 1.2 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t)=\gamma_0 \sin(\omega t) \quad (1)$$

If the applied strain is within the linear viscoelastic regime, the resulting sinusoidal stress response can be given by $$\sigma(t)=\sigma_0 \sin(\omega t+\delta) \quad (2)$$

where $\sigma_0$, and $\gamma_0$ are the stress and strain amplitudes, respectively; ω is the angular frequency; δ is the phase shift (loss angle between applied strain and stress response); t is the time.

Dynamic test results are typically expressed by means of several different rheological functions, namely the shear storage modulus, G', the shear loss modulus, G", the complex shear modulus, G*, the complex shear viscosity, η*, the dynamic shear viscosity, η', the out-of-phase component of the complex shear viscosity, η" and the loss tangent, tan η, which can be expressed as follows:

$$G' = \frac{\sigma_0}{\gamma_0}\cos\delta \text{ [Pa]} \quad (3)$$

$$G'' = \frac{\sigma_0}{\gamma_0}\sin\delta \text{ [Pa]} \quad (4)$$

$$G^* = G' + iG'' \text{ [Pa]} \quad (5)$$

$$\eta^* = \eta' - i\eta'' \text{ [Pa}\cdot s] \quad (6)$$

$$\eta' = \frac{G''}{\omega} \text{ [Pa}\cdot s] \quad (7)$$

$$\eta'' = \frac{G''}{\omega} \text{ [Pa}\cdot s] \quad (8)$$

The determination of so-called Shear Thinning Index, which correlates with MWD and is independent of Mw, is done as described in equation 9.

$$SHI_{(x/y)} = \frac{Eta^* \text{ for } (G^* = x \text{ kPa})}{Eta^* \text{ for } (G^* = y \text{ kPa})} \quad (9)$$

For example, the $SHI_{(2.7/210)}$ is defined by the value of the complex viscosity, in Pa s, determined for a value of G* equal to 2.7 kPa, divided by the value of the complex viscosity, in Pa s, determined for a value of G* equal to 210 kPa and the $SHI_{(5/200)}$ is defined by the value of the complex viscosity, in Pa s, determined for a value of G* equal to 5 kPa, divided by the value of the complex viscosity, in Pa s, determined for a value of G* equal to 200 kPa.

The values of storage modulus (G'), loss modulus (G"), complex modulus (G*) and complex viscosity (η*) were obtained as a function of frequency (ω).

Thereby, e.g. $\eta^*_{300\ rad/s}$ ($eta^*_{300\ rad/s}$) is used as abbreviation for the complex viscosity at the frequency of 300 rad/s and $\eta^*_{0.05\ rad/s}$ ($eta^*_{0.05\ rad/s}$) is used as abbreviation for the complex viscosity at the frequency of 0.05 rad/s.

The loss tangent tan (delta) is defined as the ratio of the loss modulus (G") and the storage modulus (G') at a given frequency. Thereby, e.g. $tan_{0.05}$ is used as abbreviation for the ratio of the loss modulus (G") and the storage modulus (G') at 0.05 rad/s and $tan_{300}$ is used as abbreviation for the ratio of the loss modulus (G") and the storage modulus (G') at 300 rad/s.

The elasticity balance $tan_{0.05}/tan_{300}$ is defined as the ratio of the loss tangent $tan_{0.05}$ and the loss tangent $tan_{300}$.

Besides the above mentioned rheological functions one can also determine other rheological parameters such as the so-called elasticity index EI(x). The elasticity index Ei(x) is the value of the storage modulus, G' determined for a value of the loss modulus, G" of x kPa and can be described by equation 10.

$$EI(x) = G' \text{ for } (G'' = x\text{kPa})[Pa] \quad (10)$$

For example, the EI(5 kPa) is the defined by the value of the storage modulus G', determined for a value of G" equal to 5 kPa.

The polydispersity index, PI, is defined by equation 11.

$$PI = \frac{10^5}{G'(\omega_{COP})}, \quad (11)$$

$$\omega_{COP} = \omega \text{ for } (G' = G'')$$

where $\omega_{COP}$ is the cross-over angular frequency, determined as the angular frequency for which the storage modulus, G', equals the loss modulus, G".

The values are determined by means of a single point interpolation procedure, as defined by Rheoplus software. In situations for which a given G* value is not experimentally reached, the value is determined by means of an extrapolation, using the same procedure as before. In both cases (interpolation or extrapolation), the option from Rheoplus "Interpolate y-values to x-values from parameter" and the "logarithmic interpolation type" were applied.

REFERENCES

[1] "Rheological characterization of polyethylene fractions", Heino, E. L., Lehtinen, A., Tanner J., Seppala, J., Neste Oy, Porvoo, Finland, Theor. Appl. Rheol., Proc. Int. Congr. Rheol, 11th (1992), 1, 360-362.

[2] "The influence of molecular structure on some rheological properties of polyethylene", Heino, E. L., Borealis Polymers Oy, Porvoo, Finland, Annual Transactions of the Nordic Rheology Society, 1995.

[3] "Definition of terms relating to the non-ultimate mechanical properties of polymers", Pure & Appl. Chem., Vol. 70, No. 3, pp. 701-754, 1998.

e) Viscosity $eta_{747}$

One method which is used in connection with the present invention relates to the rheology of the polymer and is based on determination of the viscosity of the polymer at a very low, constant shear stress. A shear stress of 747 Pa has been selected for this method. The viscosity of the polymer at this shear stress is determined at a temperature of 190° C. and has been found to be inversely proportional to the gravity flow of the polymer, i.e. the greater the viscosity the lower the gravity flow.

The determination of the viscosity at 747 Pa shear stress is made by using a rotational rheometer, which can be a constant stress rheometer as for example an Anton Paar MCR Series Rheometer. Rheometers and their function have been described in "Encyclopedia of Polymer Science and Engineering", 2nd Ed., Vol. 14, pp. 492-509. The measurements are performed under a constant shear stress between two 25 mm diameter plates (constant rotation direction). The gap between the plates is 1.2 mm. A 1.5 mm thick polymer sample is inserted between the plates.

The sample is temperature conditioned during 2 min before the measurement is started. The measurement is performed at 190° C. After temperature conditioning the measurement starts by applying the predetermined stress. The stress is maintained during 1800 s to let the system approach steady state conditions. After this time the measurement starts and the viscosity is calculated.

The measurement principle is to apply a certain torque to the plate axis via a precision motor. This torque is then translated into a shear stress in the sample. This shear stress is kept constant. The rotational speed produced by the shear stress is recorded and used for the calculation of the viscosity of the sample.

f) Molecular Weight Averages, Molecular Weight Distribution (Mn, Mw, Mz, MWD)

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ASTM D 6474-12 using the following formulas:

$$M_n = \frac{\sum_{i=1}^{N} A_i}{\sum_{i=1}^{N} (A_i/M_i)} \tag{1}$$

$$M_w = \frac{\sum_{i=1}^{N} (A_i \times M_i)}{\sum_{i=1}^{N} A_i} \tag{2}$$

$$M_z = \frac{\sum_{i=1}^{N} (A_i \times M_i^2)}{\sum_{i=1}^{N} (A_i/M_i)} \tag{3}$$

For a constant elution volume interval $\Delta V_i$, where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with a multiple band infrared detector model IR5 (PolymerChar, Valencia, Spain), equipped with 3× Agilent-PLgel Olexis and 1× Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. at a constant flow rate of 1 mL/min. 200 μL of sample solution was injected per analysis. Data collection was performed by using PolymerChar GPC-one software.

The column set was calibrated using universal calibration (according to ISO 16014-2:2003) with 19 narrow MWD polystyrene (PS) standards in the range of 0.5 kg/mol to 11 500 kg/mol. The PS standards were dissolved at room temperature over several hours. The conversion of the polystyrene peak molecular weight to polyolefin molecular weights is accomplished by using the Mark Houwink equation and the following Mark Houwink constants:

$$K_{PS}=19\times10^{-3}\ \mathrm{mL/g}, \alpha_{PS}=0.655$$

$$K_{PE}=39\times10^{-3}\ \mathrm{mL/g}, \alpha_{PE}=0.725$$

$$K_{PP}=19\times10^{-3}\ \mathrm{mL/g}, \alpha_{PP}=0.725$$

A third order polynomial fit was used to fit the calibration data.

All samples were prepared in the concentration range of 0.5-1 mg/ml and dissolved at 160° C. for 2.5 hours for PP or 3 hours for PE under continuous gentle shaking.

g) Determination of the SCB/1000TC Along the Molecular Weight (logM)

The IR 5 detector provides different detector signals, which were designated as concentration signal (broad spectral band covering the spectral region from 2800 $cm^{-1}$ to 3000 $cm^{-1}$), methyl ($CH_3$) (narrow band filter centered at 2959 $cm^{-1}$) and methylene ($CH_2$) (centered at 2928 $cm^{-1}$) signal. The ratio of the methyl to the methylene detector signals is correlating to the total amount of methylene ($CH_3$) per 1000 carbon atoms ($CH_3$/1000TC) (A. Ortin, B. Monrabal, J. Montesinos, P. del Hierro, Macromol. Symp. 2009, 282, 65-70). The determination of the $CH_3$/1000TC using an IR5 detector can be performed by calibrating the $CH_3/CH_2$ ratio versus the nominal $CH_3$/1000 backbone carbon content. A linear fit was used for this purpose. The branching degree of all calibration set samples was determined by $^{13}C$ melt-state NMR as described in K. Klimke, M. Parkinson, C. Piel, W. Kaminsky, H. W. Spiess, M. Wilhelm, Macromol. Chem. and Phys., 2006, 207, 382; M. Parkinson, K. Klimke, H. W. Spiess, M. Wilhelm, Macromol. Chem. and Phys., 2007, 208, 2128. The calibration set used for this method includes 17 different short chain branched polyethylenes, both single site catalysed and fractions of Ziegler Natta catalysed polyethylene-co-butene, polyethylene-co-hexene and polyethylene-co-octene covering an overall branching level up to 80 methyl groups per 1000 carbons (CH3/1000C).

The short chain branching was determined as methyl branching per 1000 total carbons and might be corrected for up to 2 methyl chain end groups per polymer chain.

h) Lamella Thickness

Successive Self-Nucleation/Annealing (SSA) technique enhances the potential molecular fractionation that can occur during crystallization by magnifying the small effects through annealing of the unmelted crystals at each stage of the process.

General references and additional information can be found in a review article by Müller and Arnal [A. J. Müller, M. L. Arnal, Thermal fractionation of polymers, Prog. Polym. Sci. 30 (2005) 559-603]. SSA was performed on an indium and tin calibrated TA Instruments Q2000 differential scanning calorimeter equipped with RCS90 cooling system. A sample mass of 5-10 mg was used from compression moulded sheets. All samples were encapsulated in Tzero aluminium pans. Ultra-high purity dry nitrogen was used as an inert atmosphere. The experimental protocol is as follows:

(a) Erasure of previous thermal history by heating the sample from room temperature to 180° C. at 20° C./min and by holding isothermally for 5 minutes.

(b) In this method, 8 subsequent cooling/heating cycles at 10° C./min were utilized and the first isothermal crystallization temperature was selected to be 126° C. The duration of each isothermal crystallization step is 5 minutes. After each isothermal crystallization step, the sample is cooled to 30° C. and held isothermally for 5 minutes.

(c) The subsequent isothermal temperatures were always maintained at 5° C. lower than the previous step, i.e., the sample is heated from 30° C. to the second isothermal crystallization temperature of 121° C.

(d) After the last isothermal crystallization step at 91° C., the sample is cooled down to 0° C., and the melting curve is obtained by heating the cooled sample at a heating rate of 10° C./min up to 180° C.

The final heating run after an SSA treatment exhibits a series of melting peaks that correspond to the number of SSA cycles, where annealing was promoted. Gibbs-Thompson equation can then be used to establish a correlation between melting temperature and lamellae thickness:

$$T_m = T_m^0\{1-(2\sigma_e/\Delta H_m^0 L_c)\}, \quad (4)$$

where $$T_m^0$$

is equilibrium melting point of infinitely thick crystal, $\sigma_e$ is the specific surface energy, $$\Delta H_m^0$$

is enthalpy of melting per mass unit, $L_c$ is lamellae thickness and $T_m$ is melting temperature of the lamellae.

$$T_m^0, \sigma_e, \text{ and } \Delta H_m^0$$

have been taken to be 415 K, 93×10$^{-3}$ J/m$^3$, and 3×10$^8$ J/m$^3$, respectively [L. Mandelkern, R. G. Alamo, Thermodynamic quantities governing melting, in: Phys. Prop. Polym. Handb., Springer, 2007: pp. 165-186.].

The melt enthalpy is calculated from the quotient of the heat flow volume and initial weight of the sample between the extrapolated onset and end of melting, as described in ISO 11357-3. A fixed integration approach, in steps of 10° C., is used for the melting curve quantification to determine the lamellae thickness distribution.

i) Tensile Properties of Films

Film tensile properties are measured at 23° C. according to ISO 527-3 with a specimen Type 2 using three-layered blown films with a thickness of 40 μm, prepared as described in the example section below. Tensile modulus in machine direction (TM-MD) and Tensile modulus in transverse direction (TM-TD) were measured as 1% secant modulus with 5 mm/min test speed and 50 mm gauge length according to ASTM D882.

Tensile stress at break (TSB-MD and TSB-TD), Tensile stress at yield (TSY-MD and TSY-TD), Elongation at break (EB-MD), Elongation at yield (EY-MD and EY-TD) were measured according to ISO 527-3 specimen Type 2 with 50 mm gauge length and 500 mm/min test speed.

j) Tear Strength

Tear testing is conducted according to ASTM 1922 on three-layered blown films with a thickness of 40 μm, prepared as described in the example section below. The Elmendorf tear strength is the force in Newton required to propagate tearing across a film specimen. It is measured using a precisely calibrated pendulum device. Acting by gravity, the pendulum swings through an arc, tearing the specimen from a precut slit. The specimen is held on one side by the pendulum and on the other side by a stationary member. The loss in energy by the pendulum is indicated by a pointer. The scale indication is a function of the force required to tear the specimen. The selection of pendulum weight was based on the absorb energy of the specimen, preferred between 20-80% of pendulum capacity. There is no direct linear relationship between tearing force and specimen thickness. Therefore only data obtained at the same thickness range should be compared.

k) Puncture Resistance

Protrusion Puncture Resistance testing is conducted according to ASTM D5748 on three-layered blown films with a thickness of 40 μm, prepared as described in the example section below. This test method determines the resistance of a film sample to the penetration of a probe with specific size of 19 mm diameter pear-shaped TFE fluorocarbon coated at a standard low rate, a single test velocity (250 mm/min). Performed at standard conditions, the test method imparts a biaxial stress loading. Cut the film specimens 150 mm×150 mm to fit into the jig and conditioning done at 23±2° C. at 50±5% relative humidity.

The Puncture Resistance Force (N) is the maximum force or highest force observed during the test and Puncture Resistance Energy (J) is the energy used until the probe breaks the test specimen, both are measured using the high accuracy 500 N loadcell and crosshead position sensor.

l) Dart Drop Impact

Dart-drop is measured according to ISO7765-1, method A (Alternative Testing Technique) on three-layered blown films with a thickness of 40 μm, prepared as described in the example section below. A dart with a 38 mm diameter hemispherical head is dropped from a height of 0.66 m onto a film clamped over a hole. Successive sets of twenty specimens are tested. One weight is used for each set and the weight is increased (or decreased) from set to set by uniform increments. The weight resulting in failure of 50% of the specimens is calculated and reported.

m) Optical Properties

Haze measured on three-layered blown films with a thickness of 40 μm, prepared as described in the example section below according to ASTM D 1003.

Gloss is measured on three-layered blown films with a thickness of 40 μm, prepared as described in the example section below according to DIN 67530/ISO 2813 at angles of 20°, 600 and 85°.

2. Examples a) Catalyst

The polymerization catalyst for polymerizing inventive example IE1 was prepared according to example 1 of EP 1 378 528 A1.

b) Polymerization of Inventive Examples IE1 and IE2 and Comparative Example CE2

In a prepolymerization stage a first loop reactor having a volume of 50 dm$^3$ was operated at 70° C. and 64 bar pressure. For producing a prepolymerization fraction ethylene, 1-butene and hydrogen were added. In addition, the polymerization catalyst prepared according to the description above and triethylaluminium (TEA) cocatalyst were introduced into the reactor. The conditions in the reactor as shown in Table 1. The polymer slurry was withdrawn from the first loop reactor and transferred into a loop reactor having a volume of 500 $dm^3$. This second loop reactor was operated at 85° C. and 64 bar pressure. Into the reactor were introduced ethylene, 1-butene and hydrogen. No additional catalyst feed was introduced into the reactor. The conditions in the reactor as shown in Table 1.

The polymer slurry was withdrawn from the second loop reactor and transferred into a flash vessel operated at 3 bar pressure and 70° C. temperature where the hydrocarbons were substantially removed from the polymer. The polymer was then introduced into a gas phase reactor operated at a temperature of 78.5° C. and a pressure of 19.6 bar. In addition ethylene, 1-butene and hydrogen were introduced into the reactor. The conditions are shown in Table 1.

The resulting polymer was purged with nitrogen (about 50 kg/h) for one hour, stabilised with 1000 ppm of Irganox 1010 and Irgafos 168 and 1000 ppm Ca-stearate and then extruded to pellets in a counter-rotating twin screw extruder CIM90P (manufactured by Japan Steel Works) so that the throughput was 223 kg/h and the screw speed was 323 rpm.

TABLE 1

Polymerization conditions of inventive example IE1

| | | IE1/IE2 | CE2 |
|---|---|---|---|
| Prepolymeriser: | | | |
| Temperature | ° C. | 70 | 70 |
| Pressure | bar | 64 | 64 |

TABLE 1-continued

Polymerization conditions of inventive example IE1

| | | IE1/IE2 | CE2 |
|---|---|---|---|
| Split | wt-% | 1.4 | 1.4 |
| H2/C3 feed ratio | kg/ton C3 | 0.2 | 0.2 |
| C4/C2 feed ratio | kg/ton C2 | 40 | 40 |
| Loop: | | | |
| Temperature | ° C. | 85 | 85 |
| Pressure | bar | 64 | 64 |
| C2-concentration | mol % | 2.43 | 2.70 |
| H2/C2 molar ratio | mol/kmol | 350 | 390 |
| C4/C2 molar ratio | mol/kmol | 641 | 570 |
| C4/C2 feed ratio | kg/ton C2 | 47-48 | 46 |
| Split | wt-% | 37.6 | 39.3 |
| $MFR_2$ | g/10 min | 270-340 | 300-330 |
| Density | kg/m$^3$ | 950.5-951.5 | 951.0-952.0 |
| Gas phase: | | | |
| Temperature | ° C. | 78.5 | 80.0 |
| Pressure | bar | 19.6 | 19.6 |
| C2-concentration | mol % | 3.6 | 3.8 |
| H2/C2 molar ratio | mol/kmol | 5.8-6.1 | 10.5-11.2 |
| C4/C2 molar ratio | mol/kmol | 765 | 743 |
| C4/C2 feed ratio | kg/ton C2 | 139-140 | 136 |
| Split | wt-% | 61.0 | 59.3 |
| Density (base resin) | kg/m$^3$ | 920.0-921.2 | 923.0 |
| $MFR_5$ (base resin) | g/10 min | 0.60-0.74 | 0.9-1.0 |

c) Comparative Example CE1

CE1 is a unimodal LLDPE resin having a density of 918 kg/m$^3$ and a melt flow rate $MFR_2$ (190° C., 2.16 kg) of 1.0 g/10 min, produced in a Unipol gas phase polymerization process, commercially available from SABIC as Sabic 118W.

d) Properties of the Polyethylene Compositions of IE1, IE2, CE1 and CE2

The polyethylene compositions of examples IE1, IE2, CE1 and CE2 have properties as shown in Table 2 below.

TABLE 2

Properties of the polyethylene compositions of IE1, IE2, CE1 and CE2

| | | CE1 | CE2 | IE1 | IE2 |
|---|---|---|---|---|---|
| Density | kg/m$^3$ | 921.9 | 922.6 | 921.0 | 920.2 |
| $MFR_2$ | g/10 min | 1.15 | 0.25 | 0.16 | 0.15 |
| $MFR_5$ | g/10 min | 3.19 | 0.99 | 0.65 | 0.61 |
| $MFR_{21}$ | g/10 min | 28 | 22.2 | 15.2 | 14.2 |
| $FRR_{21/5}$ | | 8.8 | 22.4 | 23.4 | 23.4 |
| $FRR_{21/2}$ | | 24.3 | 88.8 | 95.0 | 94.7 |
| Mn | g/mol | n.m. | 12800 | 13450 | 13450 |
| Mw | g/mol | n.m. | 180000 | 199000 | 209500 |
| Mz | g/mol | n.m. | 1015000 | 1135000 | 1225000 |
| Mw/Mn | | n.m. | 14.04 | 14.82 | 15.58 |
| Mz/Mw | | n.m. | 5.6 | 5.7 | 5.8 |
| $eta_{747}$ | kPa · s | n.m. | 59 | 96 | 102 |
| $eta_{0.05}$ | Pa · s | 8122 | 46186 | 65936 | 71162 |
| $eta_{300}$ | Pa · s | 1073 | 897 | 1006 | 1031 |
| $SHI_{2.7/210}$ | | 4.3 | 29.7 | 31.1 | 31.8 |
| $SHI_{5/200}$ | | 3.9 | 22.9 | 23.7 | 24.3 |

n.m. = not measured

Additionally, the lamella thicknesses of the compositions of examples IE1, IE2, CE1 and CE2 was measured by Successive Self-nucleation and Annealing (SSA) thermal fractionation as described above.

FIG. 1 shows the DSC melting curves of the compositions after subjecting the samples to the SSA protocol. Multi-peaked melting curves are observed for CE and IE materials, indicating independently melting crystallites that are formed during each successive self-nucleation and annealing sequence. Each of these peaks in melting curves is due to molecules or segments of molecules of a particular distance between branches. During subsequent SSA cycles, crystals initially formed under each peak at higher temperature can undergo lamella-thickening with time (5 minutes) and temperature (each subsequent step is 5° C. lower) due to the distribution in branching.

The DSC melting curves of samples subjected to SSA protocol is unique for each LLDPE material: function of catalyst, polymerization process/conditions, comonomer type and comonomer content. The area of the melting peaks at higher temperature decreases by increasing the amount of comonomer and/or by more homogenously distributing the comonomer along the polymer chain (compare unimodal CE1 with bimodal IE1 and IE2).

Based on amount of material that melts between different temperature ranges, it is possible to identify differences between the distribution of short chain branches.

Figure 2:
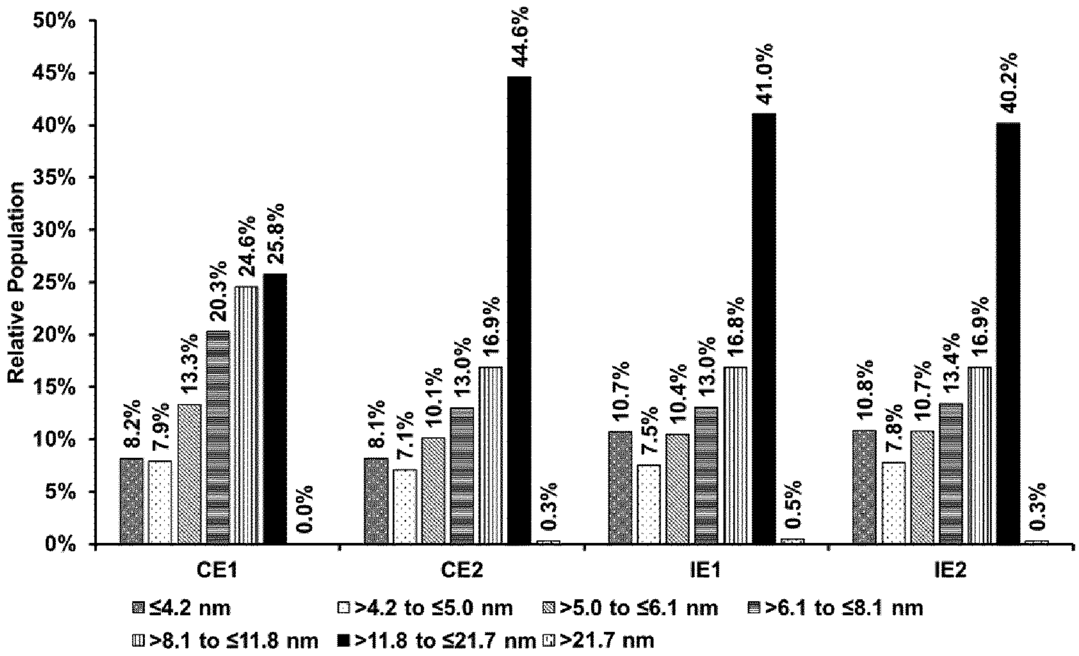
FIG. 2 shows the amounts of the fractions of different lamella thicknesses of the compositions of examples IE1, IE2, CE1 and CE2.

The amounts of the fractions of different lamella thicknesses of the compositions of examples IE1, IE2, CE1 and CE2 are shown in FIG. 2. Thereby, the fractions of different lamella thicknesses are divided in the following groups in the columns from left to right:

- Fraction with a lamella thickness of not more than 4.2 nm (≤4.2 nm),
- Fraction with a lamella thickness of more than 4.2 nm to 5.0 nm (>4.2 to ≤5.0 nm),
- Fraction with a lamella thickness of more than 5.0 nm to 6.1 nm (>5.0 to ≤6.1 nm),
- Fraction with a lamella thickness of more than 6.1 nm to 8.1 nm (>6.1 to ≤8.1 nm),
- Fraction with a lamella thickness of more than 8.1 nm to 11.8 nm (>5.0 to ≤11.8 nm),
- Fraction with a lamella thickness of more than 11.8 nm to 21.7 nm (>11.8 to ≤21.7 nm) and
- Fraction with a lamella thickness of more than 21.7 nm (>21.7 nm)

The amounts of the fractions of different lamella thicknesses are also summarized in Table 3.

TABLE 3

Amounts and ratio of the fractions of different lamella thicknesses

| Fractions | CE1 | CE2 | IE1 | IE2 |
|---|---|---|---|---|
| <4.2 nm | 8.2 wt % | 8.1 wt % | 10.7 wt % | 10.8 wt % |
| >4.2 to ≤5.0 nm | 7.9 wt % | 7.1 wt % | 7.5 wt % | 7.8 wt % |
| ≤5.0 nm | 16.1 wt % | 15.2 wt % | 18.2 wt % | 18.6 wt % |
| >5.0 to ≤6.1 nm | 13.3 wt % | 10.1 wt % | 10.4 wt % | 10.7 wt % |
| >6.1 to ≤8.1 nm | 20.3 wt % | 13.0 wt % | 13.0 wt % | 13.4 wt % |
| >5.0 to ≤8.1 nm | 33.6 wt % | 23.1 wt % | 23.5 wt % | 16.1 wt % |
| >8.1 to ≤11.8 nm | 24.6 wt % | 16.9 wt % | 16.8 wt % | 16.9 wt % |
| ≤11.8 nm | 74.3 wt % | 55.2 wt % | 58.4 wt % | 59.6 wt % |
| >11.8 to ≤21.7 nm | 25.8 wt % | 44.6 wt % | 41.0 wt % | 40.2 wt % |
| >8.1 to ≤21.7 nm | 50.3 wt % | 61.5 wt % | 57.9 wt % | 57.0 wt % |
| >21.7 nm | 0 wt % | 0.3 wt % | 0.5 wt % | 0.3 wt % |
| Ratio ≤11.8 nm/>11.8 to ≤21.7 nm | 2.88 | 1.24 | 1.42 | 1.48 |
| Ratio <4.2 nm/>11.8 to ≤21.7 nm | 0.32 | 0.18 | 0.26 | 0.27 |
| Ratio ≤4.2 nm/>5.0 to ≤6.1 nm | 0.62 | 0.80 | 1.03 | 1.01 |

It can be seen that the unimodal composition of CE1 shows a completely different pattern of amounts of the fractions of different lamella thicknesses compared to the bimodal compositions of CE2, IE1 and IE2.

When comparing the bimodal compositions of CE2, IE1 and IE2 it can be seen as most significant differences that for inventive composition IE1 and IE2 the amount of the fraction with a lamella thickness of more than 11.8 nm to 21.7 nm (>11.8 to ≤21.7 nm) is significantly lower than that of CE2 and the amount of the fraction with a lamella thickness of not more than 4.2 nm (≤4.2 nm) is significantly higher than that of CE2.

Without being bound to theory it is believed that these differences between IE1/IE2 and CE2 result from a higher amount of ethylene-1-butene copolymer fraction with a higher molecular weight produced in the gas phase reactor (61.0 wt % for IE1/E2, 59.3 wt % for CE2) and a higher amount of 1-butene comonomer in the ethylene-1-butene copolymer fraction with a higher molecular weight produced in the gas phase reactor (765 mol C4/kmol C2 for IE1/IE2, 743 mol C4/kmol C2 for CE2). These measures result in a higher and more even 1-butene comonomer distribution in the longer polymeric chains of the ethylene-1-butene copolymer fraction with a higher molecular weight. This was achieved by manipulating the process design and thereby changing the polymer molecular structure. For example, the polymerization in the gas phase reactor was promoted by reducing the H2 concentration and increasing the comonomer content compared to the reference example CE2. This in turn increases the comonomer incorporation. Specifically, the comonomer incorporation is facilitated in the high molecular weight regions of the polymer composition.

Figure 3:
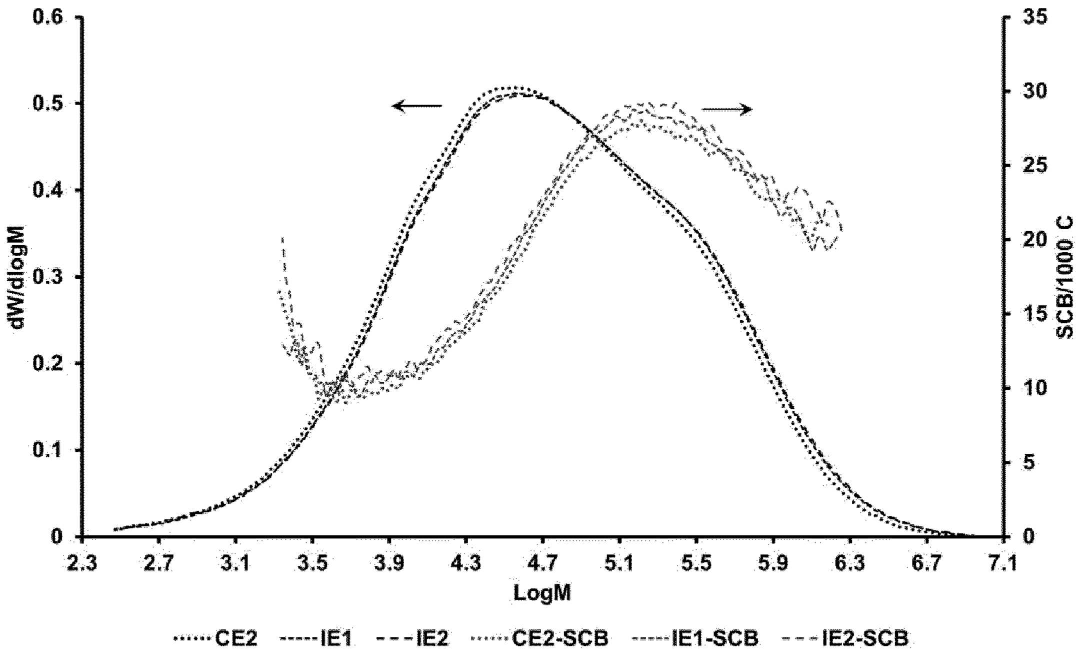
FIG. 3 shows the GPC data over the molecular weight (solid lines) together with the amount of short chain branching SCB/1000 C over the molecular weight (dotted lines) for the compositions of CE2, IE1 and IE2.

Said finding is verified in FIG. 3 which shows the GPC data over the molecular weight (solid lines) together with the amount of short chain branching SCB/1000 C over the molecular weight (dotted lines) for the compositions of CE2, IE1 and IE2. In the GPC data a shoulder for the high molecular weight ethylene-1-butene fraction is shown for all compositions starting at ~LogM 5.0, indicating a bimodal composition, which, however, is more pronounced for IE1 and IE2. Additionally, the short chain branching curves for the same molecular weight region show a higher amount of SCB/1000 C for IE1 and IE2 compared to CE2.

e) Film Sample Preparation

The test films consisting of three layers each of the compositions as described above (monomaterial three layer blown film) of 40 μm thickness, were prepared using a large scale 3 layer coextrusion blown film line (Polyrema Machinery).

The die width was 400 mm, die gap was 1.8 mm, total film thickness of film was 40 μm.

The lower neck-height and blow-up ratio (BUR) was 3.0.

The extrusion conditions and film properties are listed in Table 4.

All samples were easy to process and exhibited good bubble stability.

TABLE 4

Extrusion conditions and properties of the blown films of CE1, CE2, IE1 and IE2

| | Unit | CE1 | CE2 | IE1 | IE2 |
|---|---|---|---|---|---|
| Extrusion conditions: | | | | | |
| Motor load | amps | 23.6 | 20.8 | 24.2 | 22.1 |
| Extruder throughput | kg/hr | 75.3 | 69.8 | 71.1 | 70.0 |
| Melt pressure | bar | 289 | 312 | 359 | 359 |
| Melt temperature | ° C. | 200 | 219 | 222 | 222 |
| Mechanical properties: | | | | | |
| Tensile Modulus (MD) | MPa | 266 | 355 | 337 | 323 |
| Tensile Modulus (TD) | MPa | 323 | 496 | 422 | 422 |
| TSY-MD | MPa | No yield | No yield | No yield | No yield |
| TSY-TD | MPa | 12.6 | 13.3 | 13.0 | 12.0 |
| TSB-MD | MPa | 53.2 | 63.6 | 66.0 | 70.8 |
| TSB-TD | MPa | 28.0 | 42.4 | 44.0 | 47.1 |
| EB-MD | % | 497 | 462 | 419 | 432 |
| EB-TD | % | 708 | 749 | 727 | 736 |
| EY-MD | | No yield | No yield | No yield | No yield |
| EY-TD | | 4.7 | 8.3 | 9.0 | 8.8 |
| Tear Strength (MD) | N | 1.5 | 4.7 | 5.4 | 3.3 |
| Tear Strength (TD) | N | 4.7 | 11.1 | 10.2 | 11.6 |
| Puncture resistance, force | N | 28.5 | 45.3 | 46.0 | 43.0 |
| Puncture resistance, energy | J | 1.1 | 2.3 | 2.3 | 2.0 |
| DDI | g | 150 | 228 | 300 | 468 |
| Optical properties: | | | | | |
| Haze | % | 33.6 | 82.4 | 86.5 | 84.7 |
| Gloss at 20° | % | n.m. | 0.7 | 0.6 | 0.6 |
| Gloss at 60° | % | 47.7 | 8.7 | 7.8 | 7.9 |
| Gloss at 85° | % | n.m. | 46.2 | 40.6 | 39.9 |

n.m. = not measured

The inventive example IE1 and IE2 show an improved balance of properties compared to CE1 and CE2 with comparable tensile properties and improved dart drop impact (DDI) together with higher haze.

Surprisingly high dart drop impact (DDI) is observed for the inventive examples IE1 and IE2 although 1-butene was used as comonomer in the linear low density copolymers.

High haze leads to a better diffraction of light which has shown to improve the crop yield performance of the films when used as greenhouse films.

The invention claimed is:

1. A polyethylene composition comprising a multimodal linear low density ethylene copolymer, wherein the linear low density ethylene copolymer comprises fractions varying in lamella thicknesses and the ratio of the amount of the fractions having a lamella thickness of not more than 11.8 nm to the amount of the fraction having a lamella thickness of from more than 11.8 nm to not more than 21.7 nm is in the range of from 1.30 to 1.60.

2. The polyethylene composition according to claim 1, wherein the amount of the fraction having a lamella thickness of more than 11.8 nm to not more than 21.7 nm is from 35.0 to 60.0 mol % of the total amount of the linear low density ethylene copolymer.

3. The polyethylene composition according to claim 1, wherein the amount of the fraction having a lamella thickness of not more than 5.0 nm is from 17.0 to 30.0 mol % of the total amount of the linear low density ethylene copolymer.

4. The polyethylene composition according to claim 1, wherein the amount of the fraction having a lamella thickness of not more than 4.2 nm is at least 8.5 mol % of the total amount of the linear low density ethylene copolymer.

5. The polyethylene composition according to claim 1, wherein the ratio of the amount of the fraction having a lamella thickness of not more than 4.2 nm to the amount of the fraction having a lamella thickness of more than 11.8 nm to not more than 21.7 nm is in the range of from 0.20 to 0.30.

6. The polyethylene composition according to claim 1, wherein the ratio of the amount of the fraction having a lamella thickness of not more than 4.2 nm to the amount of the fraction having a lamella thickness of from more than 5.0 nm to not more than 6.1 nm is in the range of from 0.85 to 1.15.

7. The polyethylene composition according to claim 1, wherein the linear low density copolymer is a copolymer of ethylene and 1-butene.

8. The polyethylene composition according to claim 1, wherein the linear low density copolymer has a density of from 915.0 to 925.0 kg/m$^3$.

9. The polyethylene composition according to claim 1, wherein the linear low density ethylene copolymer comprises two ethylene copolymer fractions which differ in their molecular weight, wherein the weight ratio of the low molecular weight ethylene copolymer fraction and the high molecular weight ethylene copolymer fraction in the linear low density ethylene copolymer is from 25.0:75.0 to 44.0:56.0.

10. The polyethylene composition according to claim 9, wherein the ratio of the number of short chain branches/1000 carbon atoms (SCB/1000 C) in the polymeric chain of the high molecular weight ethylene copolymer fraction is in the range of from 15.0 to 35.0%.

11. The polyethylene composition according to claim 1 having a melt flow rate $MFR_5$ (5 kg, 190° C.) of from 0.40 to 0.85 g/10 min.

12. An article comprising the polyethylene composition according to claim 1.

13. The article according to claim 12 being a film, which has a dart drop impact DDI of at least 250 g, when measured according to ISO 7765-1 on a 40 um blown film.

14. The article according to claim 12 being a film, which has a tensile modulus (1% secant, MD) is at least 275 MPa, when measured according to ISO 527-3 on a 40 μm blown film.

* * * * *